Oct. 11, 1932.  C. L. MATTISON  1,881,802
CONTROL MECHANISM FOR TURNING MACHINES
Original Filed June 21, 1929  2 Sheets-Sheet 1
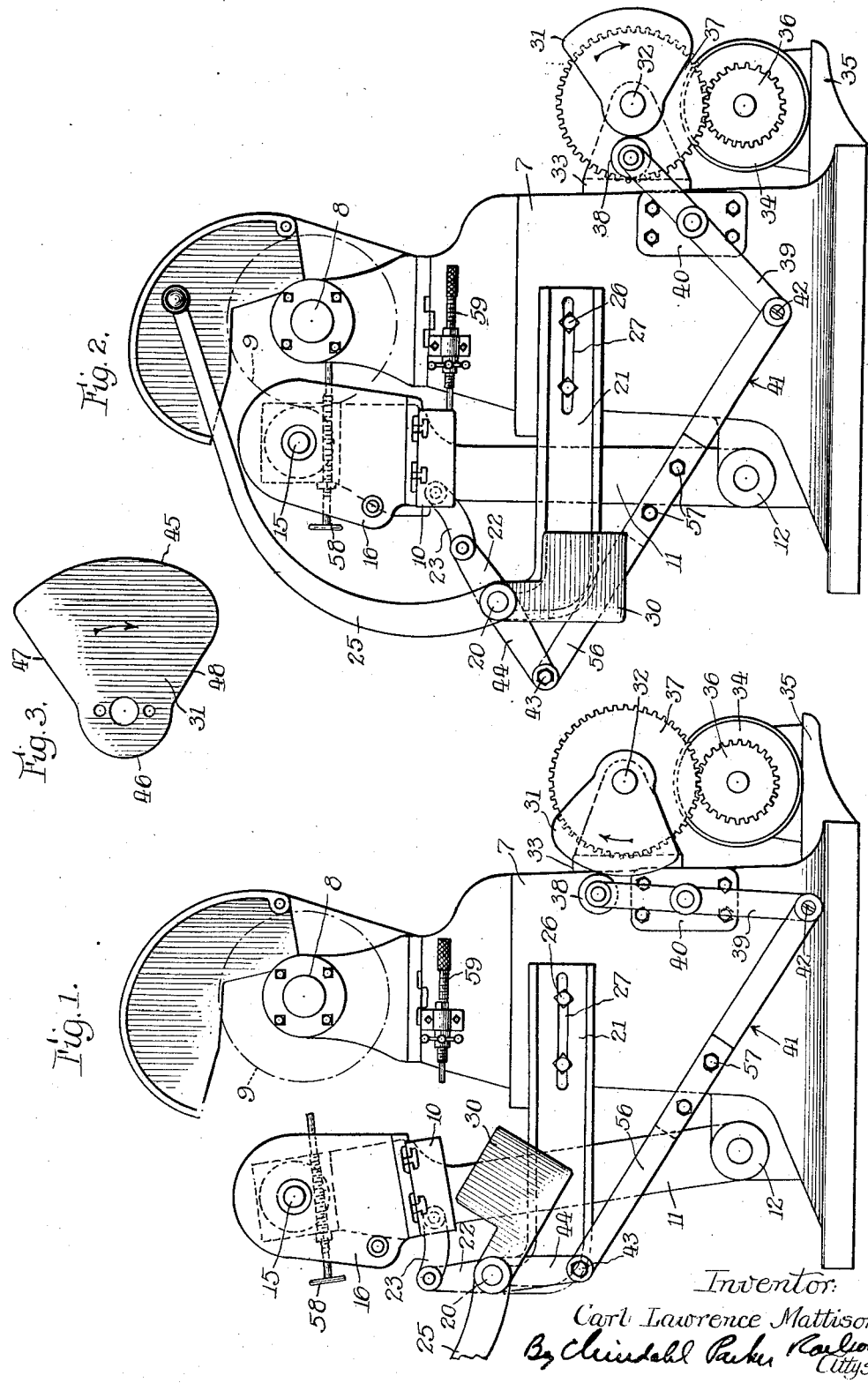
Inventor:
Carl Lawrence Mattison

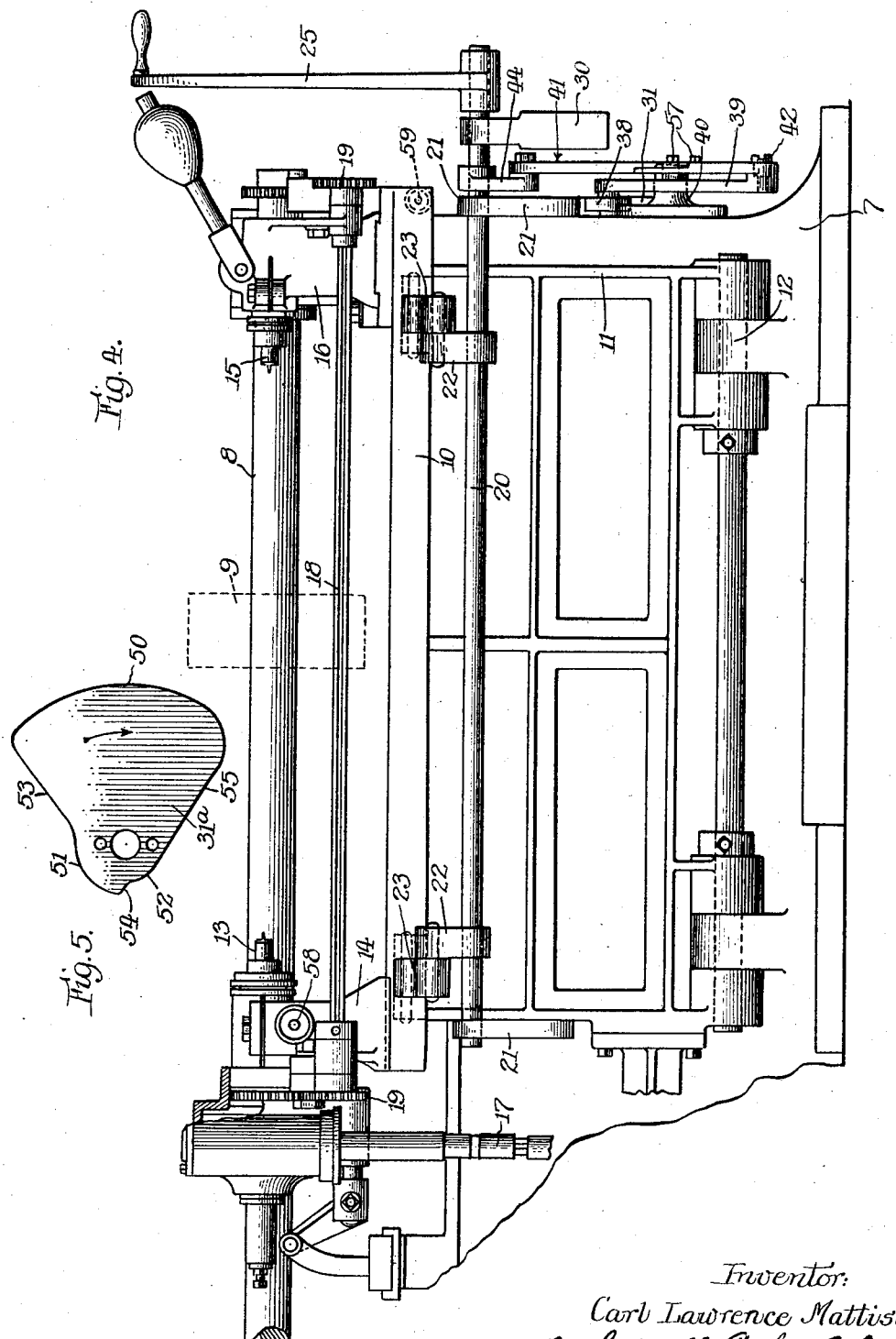

Patented Oct. 11, 1932

1,881,802

UNITED STATES PATENT OFFICE

CARL LAWRENCE MATTISON, OF ROCKFORD, ILLINOIS, ASSIGNOR TO MATTISON MACHINE WORKS, OF ROCKFORD, ILLINOIS, A CORPORATION OF ILLINOIS

CONTROL MECHANISM FOR TURNING MACHINES

Application filed June 21, 1929, Serial No. 372,622. Renewed January 27, 1932.

The invention relates generally to wood turning machines of the type having a high speed rotary cutter mounted on a frame and a pair of rotatable work supporting spindles mounted on a swingable frame movable from an inoperative or loading position away from the cutter to an operative position adjacent the cutter and more particularly to a mechanism for automatically controlling the movements of the swingable work support.

It has been the custom in machines of this type to provide means for moving the work support manually toward and from the cutter. When the work is in its operative position adjacent the cutter the work supporting spindles are rotated preferably by means of a power drive so that when the work has completed one or more revolutions depending upon the character and material of the work, the swingable support is moved away from the cutter in order to permit the operator to remove the finished work piece from the work spindles to insert a new piece.

A machine of this character is illustrated in application Serial No. 40,728, filed July 1, 1925, by Charles E. La Pointe and myself, now Patent No. 1,735,906, wherein means is disclosed for automatically positioning work pieces so that they will be cleared by the work spindles when the work support is swung to its inoperative position together with means for automatically withdrawing the spindles from the finished work piece while the work support is moving away from the cutter and to engage the work spindles with a new piece when the work support is in its inoperative or loading position.

The present invention relates to improvements in machines of the general type hereinbefore referred to and relates particularly to automatic mechanism for swinging the work support from its loading position to its operative position, and back again and for controlling the inward movement of the work support toward the cutter. In this respect, I aim not only to improve the machine so that it requires less attention on the part of an operator but also to increase its efficiency by causing a withdrawal of the work support from the cutter immediately upon completing the cut so that there will be no time lost in removing the finished work and inserting the new work piece. Furthermore, the time during which the work support is in inoperative or loading position is definitely determined so as to require prompt reloading.

It is the general object of the invention to provide a turning machine embodying new and improved means for automatically controlling the movements of the work support as indicated and yet permitting manual withdrawal of the work support from the cutter at any time during the cutting operation so that an operator by so manually withdrawing the work support, can prevent injury to the machine or cutters in case a work piece becomes jammed or for any reason may possibly injure the cutter.

For purposes of disclosure, I have illustrated in the drawings quite generally only the fundamental or major elements of a wood turning machine in which a preferred form of the invention is embodied, it being contemplated, however, that the machine may embody other automatic devices such as those disclosed in said copending application or that it may be modified in other respects depending upon the nature of the particular work to be accomplished. It is to be understood that the disclosure herein is essentially for the purpose of illustrating the one form of the invention and that I do not intend to limit the invention to the particular construction and arrangement shown. I aim to cover all modifications and alternative constructions falling within the spirit and scope of the invention as expressed in the appended claims.

In the drawings:

Figure 1 is a side elevational view of a wood turning machine embodying a preferred form of the invention, showing the swingable work support in its inoperative or loading position.

Fig. 2 is a similar view showing the work support in its operative position adjacent the cutter.

Fig. 3 is an enlarged detail view of one form of cam member used in conjunction with the form of the invention illustrated to control the movements of the work support.

Fig. 4 is a front elevational view of the machine shown in Figs. 1 and 2.

Fig. 5 is an enlarged detail view of an alternative form of cam member.

Machines of this character which are used for production work are generally provided with a rapidly rotating cutter arranged to operate upon a slowly rotating work piece to remove material from the periphery thereof. With such a machine the work is fed toward the rapidly rotating cutter until the cutter has reached the desired depth of cut, this particular movement of the cutter and the work piece relative to each other being hereinafter termed "feeding the cutter to depth." After the cutter has reached its depth the rotation of the work piece through a single revolution, causes the cutter to remove stock from the periphery of the piece down to this particular depth.

The feeding of the work to the cutter and in to depth is normally governed manually by the operator and in case the work is fed too rapidly to depth, many undesirable results may occur. In some instances the work piece is thrown from between the two work centers which of course endangers the operator as well as the machine. In other cases, too rapid feeding of the work results in tearing the work, breaking of the cutter head or cutter knives or in excessive dulling of the knives.

It has also been found that, due primarily to the fact that the cut is made on the side opposite from the operator, it is impossible for the operator to determine accurately when the cutting operation is completed and the work piece is often held in its operative position adjacent the cutter for considerable time after the completion of the cutting operation. During this time the finished work piece continues to rotate and the cutting edges of the cutter knives rub against the finished surface thereof which results in burning the work piece and heating the knives so as to remove the temper therefrom.

The machine illustrated herein is of the type shown in the above mentioned application and embodies a stationarily mounted rotating cutter head and a swingable work table movable to and from operative relation with the cutter. A main frame or base 7 is provided on which a cutter spindle 8 is rotatably mounted and carries a cutter 9 shown in dotted outline in the drawings. The work is supported upon a movable table 10 mounted for movement between an operative position adjacent the cutter 9 to an inoperative position remote from the cutter. The table 10 is carried on the upper end of an upright frame 11 having its lower end pivotally supported by suitable bearings 12 (Fig. 2) on the forward side of the base 7.

The work is supported and rotated on the swingable table 10 by conventional means such as a headstock spindle 13 mounted in a headstock 14 fixed at one end of the table and a tailstock spindle 15 rotatably mounted in a tailstock support 16 which may be adjusted longitudinally along the table 10. The headstock and tailstock spindles 13 and 15 are in the present embodiment driven simultaneously by means including a vertical shaft 17 and a splined shaft 18 having its opposite ends mounted in the headstock 14 and the tailstock 16 respectively and operatively connected to the two spindles by gearing 19 (Fig. 4).

For swinging the table 10 toward and away from the frame 7 to move the work to and from the cutter a rock shaft 20 is supported at a substantial distance from the frame 7 upon forwardly extending brackets 21 secured on the opposite ends of the frame 7 and a plurality of toggles are interposed between the shaft 20 and the table 10. The toggles herein comprise a pair of lever arms 22 secured on the shaft 20 adjacent the opposite ends of the table and a pair of links 23 each having its opposite ends pivotally connected to the end of one of the lever arms 22 and to the frame 11 respectively. Thus by rocking the shaft 20 by means of an operating lever 25 secured on an end of the shaft 20, the table 10 may be moved toward and from the cutter 9.

During the performance of a cutting operation, the successive impacts of the radial knives (not shown) of the rapidly rotating cutter 9 upon the work piece exerts a recurrent force upon the table 10 tending to move the table away from the cutter. By arranging the toggle operators so that they are in substantially their extended positions when the cutting operation is being performed, this recurrent force will be absorbed almost entirely by the toggles and the force which must be exerted on the rock shaft 20 to maintain the table in its proper position will be substantially reduced.

In order that this desirable position of the toggles may be obtained when the lathe is used for various sizes of work the brackets 21 are adjustably secured on the frame 7 by bolts 26 extending through horizontal slots 27 in the brackets 21 so as to permit of adjustment of the rock shaft toward and from the frame substantially along the path of movement of the frame 11.

Thus to adjust the table actuating mechanism for a different size of finished work, the bolts 26 are loosened and the table is advanced toward the cutter 9 to the position necessary to produce the desired diameter of work. The table 10 is then held in this position and the shaft 20 is rocked by means of the handle 25 until the toggles are nearly in their extended positions. Since the table has been maintained in the same position the extension of the toggles moves the rock shaft 20 and its supporting brackets 21 to another position and the bolts 26 are tightened to maintain them in their newly determined relation to the frame 7.

To control the relative movement of the work piece and the cutter, means is provided which preferably operates in timed relation to the work driving means to actuate and control automatically the movement of the swingable table 10 so as to feed the cutter to depth and control the cutting of material from the periphery of the stock and thereafter, upon completion of the cutting operation, to retract the table to its inoperative position to permit of loading of a new piece of work on the work supports.

In the present embodiment a weight 30 fixed eccentrically on the rock shaft 20 tends normally to rotate the shaft 20 to extend the toggles and move the work table 10 toward its operative position adjacent the cutter 9 and means is provided to control the movement of the table caused by the weight 30. This means comprises a disk type cam member 31 secured on a shaft 32 rotatably mounted parallel to the rock shaft 20 on a bracket 33 fixed on the rear side wall of the base 7 near one end thereof. A motor 34 mounted beneath the cam shaft 32 on a bracket 35 rotates the cam 31 through a pinion 36 on the motor shaft engaging a gear 37 fixed on the cam shaft 32. The cam 31 acts on a roller 38 engaging the periphery of the cam and fixed on one end of a lever 39 pivoted intermediate its ends on a stud 40 secured on the end of the base 7. A link 41 extending forwardly along the end of the base 7 and having one end pivoted at 42 to the lever 39 and its other end pivotally secured at 43 to an arm 44 fixed on the rock shaft 20 serves to transmit movement of the lever 39 to the rock shaft 20. Through the connection thus formed, the rotation of the shaft 20 under the influence of the weight 30 maintains the roller 38 in engagement with the cam 31.

Since the table 10 is yieldingly actuated toward its operating position it may be retracted at any time by the manual operating handle 25 so as to avoid breaking of the work or the knives or the like.

The cam 31 rotates in a clockwise direction as indicated in Figs. 1 and 2 and its outer surface is shaped to provide a plurality of alternate dwell portions and leading portions merging with each other and causing alternate periods of rest and movement of the table 10. The form of cam shown in Figs. 1, 2, and 3, contemplates the completion of the work piece by the removal of a single annular layer of stock therefrom and hence has two dwell portions 45 and 46 concentric with the cam shaft 32 but different radial distances therefrom and connected by leading portions 47 and 48 each extending at an angle to a radius of the cam.

The outer dwell portion 45 serves to hold the table 10 stationary in its inoperative or loading position and is preferably made of considerable angular extent so as to afford the operator ample time to adjust and clamp the new work piece between the centers. At the trailing end of the dwell 45 the leading portion 47 extends toward the axis of the cam shaft 32 at a slight angle to a radius of the cam so that upon continued rotation of the cam, the roller 38 will be allowed to approach the axis of the cam shaft. This leading portion 47 therefore controls the advancing movement of the table 10 and the feeding of the cutter 9 to depth in the work piece.

The portion 47 merges with the other dwell portion 46 so that after the cutter has been fed to depth, the work and the cutter are maintained in the relation shown in Fig. 2 while an annular layer of stock is cut from the work piece. The leading portion 48 slopes outwardly from the axis of the cam so that during continued rotation of the cam and after completion of the annular cut, the roller 38 is moved away from the axis of the cam and the table 10 is retracted to its inoperative position shown in Fig. 1 and maintained in that position by the dwell portion 45 until the operator has had sufficient time to insert a new work piece.

In some instances it is necessary to remove two annular layers of stock from a work piece in order to obtain accuracy in the finished work and avoid breaking of the stock and a cam 31ª such as that shown in Fig. 5 may be provided for this purpose. The periphery of the cam 31ª is shaped to provide three dwell portions 50, 51, and 52 at different radial distances from the center of the cam, connected by leading portions 53, 54, and 55. The dwell portion 50 is of the greatest radius and serves to maintain the work table 10 in its retracted position while the leading surface 53 controls the feeding of the cutter to depth for removing a roughing cut of stock and the dwell portion 51 maintains the table in stationary position while such a cut is made. The leading surface 54 then allows the work to advance to its final depth and the leading surface 55 engages the roller 38 after the completion of the finishing cut to retract the work table.

By providing a motor 34 having a definite speed, the rate of rotation of the cam 31 may be made to bear a definite relation to the rotating speed of the work so that the cam 31 will retract the table 10 immediately upon the completion of a peripheral cutting operation. Thus the construction herein shown avoids the loss of time and the dulling of the cutter knives which results from leaving the work in operative relation to the cutter after the peripheral cut has been completed.

The connection between the cam roller 38 and the rock shaft 20 is arranged to permit of easy adjustment by forming the link 41 in two sections 56 secured together by bolts 57 so that the length of the link 41 may be varied. Thus the toggles may be adjusted to their most efficient position for each different size of work so as to avoid undue strain upon the cam and the connecting members.

It will be noted that but a single cam is used to control the movement of the work table 10 and that by forming an actuating connection through the rock shaft 20 and the toggles an equal amount of force is exerted upon and an equal amount of movement is imparted to the frame 11 so as to avoid any tendency to twist the frame.

To provide for extreme accuracy in the finished work, a pair of adjustable stops may be provided arranged to act between the table 10 and the frame 7 at the opposite ends of the table 10. In the present instance one of the stops comprises a rod 58 in screw threaded engagement with and extending through the headstock 14 substantially parallel to the path of movement of the table 10 and at the left end thereof (Fig. 4) so that the end of the rod will abut the frame 7 when the table is advanced toward the cutter. The other stop is in the form of a screw threaded rod 59 similarly mounted on the right end of the frame 7 arranged to engage the table 10 as it is moved toward the cutter.

The stop rods 58 and 59 may be adjusted so as to determine the position of the table during the finishing cut, thus avoiding all possibility of inaccurate work. When the stops are employed they serve to maintain the roller 38 out of contact with the innermost dwell surface of the cam.

In the operation of the machine the control cam is continuously rotated so as to definitely determine the length of time consumed by each turning operation and the operator positions and clamps a new work piece between the spindles each time the table is retracted. The table is held stationary in its retracted position by the dwell portion 45 of the cam for a sufficient length of time to permit either manual or automatic clamping of the work, depending upon the type of machine and the table is then permitted to move toward its operating position at a rate controlled by the leading portion 47 of the cam. During such movement the toggles are extended so that the pounding of the cutter knives on the work will not tend to move the table and the two stops at the opposite ends of the table are brought into engagement with their opposing abutments so as to accurately determine the size of the work. After the completion of the cutting operation the leading surface 48 of the cam moves the roller 38 and the parts connected thereto so as to retract the table 10 and permit loading of a new piece of work.

If, at any time during the operation it is desired to retract the table, it may be accomplished readily by movement of the manual actuating handle.

I claim as my invention:—

1. A turning machine comprising, in combination, a first frame having a cutter mounted thereon, a second frame for rotatably supporting a work piece, one of said frames being movable to and from an operating position adjacent the other frame, means for moving said movable frame to and from its operating position comprising a rock shaft mounted on the stationary frame transversely of the path traversed by said movable frame and adjustable substantially along said path, a pair of toggles interposed between said rock shaft and said movable frame adjacent opposite ends of said frame, each toggle comprising an arm fixed on said shaft and a link pivotally connecting said arm with said movable frame, means tending to move said movable frame toward its operating position, means for rocking said shaft to move said movable frame from said operating position, said last means including a rotatable cam mounted on said stationary frame, a follower for said cam, and adjustable means connecting said follower and said shaft eccentrically of said shaft.

2. A turning machine comprising, in combination, a first frame having a cutter mounted thereon, a second frame for rotatably supporting a work piece, one of said frames being movable to and from an operating position adjacent the other frame, means for moving said movable frame to and from its operating position comprising a rock shaft mounted on the stationary frame transversely of the path traversed by said movable frame and adjustable substantially along said path, an arm on said shaft, and a link connecting said arm to said movable frame and forming with said arm a toggle whereby rocking movement of said shaft reciprocates said frame, and means for rocking said shaft including a rotatable cam, a follower for said cam, and adjustable means connecting said follower and said shaft arranged to rock said shaft upon rotation of said cam.

3. A turning machine comprising, in combination, a first frame having a cutter mounted thereon, a second frame for rotatably supporting a work piece, one of said frames being movable to and from an operating position adjacent the other frame, means for moving said movable frame to and from its operating position comprising a rock shaft mounted on the stationary frame transversely of the path traversed by said movable frame and adjustable substantially along said path, means on said shaft operable upon rocking movement of said shaft to reciprocate said frame, and means for rocking said shaft comprising a rotatable cam, a follower for said cam, and adjustable means connecting said shaft and said follower arranged to rock said shaft upon rotation of said cam.

4. A turning machine comprising, in combination, a first frame having a cutter mounted thereon, a second frame for rotatably supporting a work piece, one of said frames being movable to and from an operating position adjacent the other frame, means for moving said movable frame to and from its operating position comprising a rock shaft mounted on the stationary frame transversely of the path traversed by said movable frame and adjustable substantially along said path, means connecting said shaft and table operable on rocking movement of said shaft to reciprocate said frame, a manual operating handle for rocking said shaft, means tending to move said movable frame toward its operating position and means for controlling such movement of the movable frame comprising a rotatable cam, a cam follower therefor, and means connecting said follower to said shaft eccentrically thereof so that the tendency of said movable frame to move toward the cutter normally maintains said roller in contact with said cam, said roller being movable away from said cam by manually retracting said movable frame by means of said handle.

5. A turning machine comprising, in combination, a first frame having a cutter mounted thereon, a second frame for rotatably supporting a work piece, one of said frames being movable to and from an operating position adjacent the other frame, actuating means for moving said movable frame toward and from its operating position, said means being adjustably mounted on said stationary frame, means tending to move said movable frame toward its operating position, and means for moving said movable frame from its operating position and controlling its movement toward said position, said means comprising a rotatable cam, a follower for said cam and adjustable means connecting said follower and said actuating means, the engagement between said follower and said cam being such that the movable frame may at any time be retracted from its operating position by manual operation of said frame actuating means.

In testimony whereof, I have hereunto affixed my signature.

CARL LAWRENCE MATTISON.